(12) United States Patent
Queener et al.

(10) Patent No.: US 7,410,198 B1
(45) Date of Patent: Aug. 12, 2008

(54) AUTOMOTIVE VEHICLE WITH REPOSITIONABLE D-PILLAR ROOF STRUCTURE

(75) Inventors: Lawrence Queener, Pinckney, MI (US); Henry W. Hausler, Manchester, MI (US); Andrew Sarkisian, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 427 days.

(21) Appl. No.: 11/162,771

(22) Filed: Sep. 22, 2005

(51) Int. Cl.
*B60P 3/34* (2006.01)
(52) U.S. Cl. ............ 296/24.33; 296/26.08; 296/216.01
(58) Field of Classification Search .............. 296/26.09, 296/99.1, 26.01, 216.01, 24.33, 26.08, 147
See application file for complete search history.

(56) References Cited

U.S. PATENT DOCUMENTS

| | | | |
|---|---|---|---|
| 3,823,977 A | 7/1974 | Fioravanti | |
| 4,005,900 A | 2/1977 | Rauthmann et al. | |
| 4,712,827 A | 12/1987 | Jensen | |
| 5,015,028 A | 5/1991 | Bonnett | |
| 5,050,663 A | 9/1991 | Rhoads et al. | |
| 5,633,571 A | 5/1997 | Huyer | |
| 5,698,907 A | 12/1997 | Weber | |
| 6,059,340 A | 5/2000 | Thompson et al. | |
| 6,305,740 B1 | 10/2001 | Staser et al. | |
| 6,398,291 B1 | 6/2002 | Reusswig et al. | |
| 6,422,636 B2 | 7/2002 | Mentink | |
| 6,547,298 B2 | 4/2003 | Sotiroff et al. | |
| 6,550,849 B1 | 4/2003 | Dosdall | |
| 6,623,064 B2 | 9/2003 | Schutt et al. | |
| 6,729,674 B2 | 5/2004 | Davis et al. | |
| 6,729,684 B2 | 5/2004 | Arnold et al. | |
| 7,093,870 B2 * | 8/2006 | Kim et al. ................ 296/24.33 |
| 2002/0008396 A1 | 1/2002 | De Gaillard | |
| 2002/0079718 A1 * | 6/2002 | Neubrand ................. 296/99.1 |
| 2004/0007900 A1 | 1/2004 | Block | |

\* cited by examiner

*Primary Examiner*—Joseph D Pape
(74) *Attorney, Agent, or Firm*—Dickinson Wright PLLC; Gigette Bejin

(57) ABSTRACT

An automotive vehicle body includes a tailgate and a repositionable D-pillar structure which is slidingly engaged with the body and movable from a first position adjacent the tailgate to a second position forward of the tailgate. A sliding backlite may either be retracted within the tailgate or carried upon and moved with the D-pillar structure. In one embodiment, quarter window panels, which may be either glass or other types of solid panels, are positionable within either the window openings of the D-pillar roof structure or within housings contained within the vehicle's quarter panels.

19 Claims, 11 Drawing Sheets

AUTOMOTIVE VEHICLE WITH REPOSITIONABLE D-PILLAR ROOF STRUCTURE

TECHNICAL FIELD

The present invention relates to a motor vehicle which is readily reconfigurable from a station wagon configuration to a pickup truck configuration, with or without a rear window. This capability is facilitated by a rear window module which may be positioned either upon the tailgate of the vehicle or allowed to move translationally upon a sliding D-pillar roof structure.

BACKGROUND

Reconfigurable vehicles have been the subject of frequent design efforts by automotive engineers. U.S. Pat. No. 4,712,827 discloses a convertible car in which the top of the vehicle is lowered into the bed of the vehicle, allowing a hinged tailgate borne upon a sliding frame member to be moved to a position behind the front seat of the vehicle.

US Patent Publication 2002/0008396 discloses a motor vehicle with a convertible passenger compartment in which a sliding section having either a fixed backlite, or a backlite which is retractable solely into the tailgate of the vehicle is slidably moved under a fixed roof section of the vehicle. In both cases, the quarter window glazing panels must be removed manually. A problem with the system described in the '396 publication resides in the fact that the backlite is not available when the vehicle is reconfigured from a station wagon type of configuration to a pickup type of configuration. This means that the vehicle cannot be made weather tight and theft-resistant as a pickup truck; these are decided drawbacks for most vehicle buyers. A system according to the present invention solves the problems associated with these prior art configurations.

SUMMARY OF THE INVENTION

According to the present invention, an automotive vehicle body includes a plurality of passenger access doors, opposing quarter panels extending rearwardly from locations of at least two of the access doors, and a tailgate attached to the body adjacent to the trailing portions of the quarter panels. A repositionable D-pillar structure is slidingly engaged with the quarter panels and movable along an upper surface of each quarter panel from a first position adjacent the tailgate to a second position forward of the tailgate. A backlite is provided which has at least an open position in which the backlite is retracted within the tailgate, a closed position in which the backlite extends between the tailgate and the D-pillar structure, and a traveling position in which the backlite is released from the tailgate and is carried upon, and movable translationally with, the D-pillar structure.

According to another aspect of the present invention, a plurality of retractable quarter window glazing panels is provided, with each of the panels having a first position within a window opening in the D-pillar structure, and a second position within a mating one of the quarter panels at a location above a roadwheel. The quarter window glazing panels preferably comprise a plurality of generally horizontal glazing panels having a first position in which the panels are stacked vertically in one of the window openings, and a second position in which the panels are stored side-by-side within housings contained within the quarter panels.

According to another aspect of the present invention, the backlite carried upon the repositionable D-pillar structure may be sealingly engaged with a second row of seats or a bulkhead within the vehicle body when the D-pillar is in its second, or forward, position. In this manner, the passenger compartment may be rendered weather-tight and secure even when the vehicle's roof has been contracted by moving the repositionable D-pillar forward.

A repositionable D-pillar structure according to present invention may further include a slidable roof panel mounted within the D-pillar structure and slidable upon a first set of tracks formed in the D-pillar structure and a second set of tracks formed in a fixed roof panel. Alternatively, a slidable roof panel may be fixed to and mounted within the D-pillar structure and slidable upon a single set of tracks formed in a fixed roof panel. The D-pillar structure itself is preferably slidable upon a first set of tracks carried by the quarter panels and a second set of tracks carried by a fixed roof panel.

According to another aspect of the present invention, the D-pillar roof structure, the backlite, and the retractable quarter window panels may each be motor driven, so as to allow automatic or semi-automatic operation of a system according to the present invention.

According to another aspect of the present invention, a method for operating a sliding D-pillar roof structure in an automotive vehicle includes the steps of raising a backlite from a tailgate and into an immobilized or locked position within a sliding D-pillar roof structure, lowering a plurality of generally horizontal quarter window glazing panels from positions within the D-pillar roof structure and into stored positions within housings contained within opposing quarter panels at positions above roadwheels associated with the quarter panels, and sliding the D-pillar roof structure, incorporating the backlite, forwardly upon a first set of tracks carried by the quarter panels and a second set of tracks carried by a fixed roof panel.

It is an advantage of a system according to present invention that a weather-tight cabin may be provided for a reconfigurable vehicle in not only a station wagon configuration, but also a pickup configuration.

It is a further advantage of the present invention that not only a sliding panel roof portion may be moved out of the way of the pickup bed area of a reconfigurable vehicle, but also a sliding D-pillar to which the sliding roof panel is mounted may be moved out of the way, so as to allow loading of large items from positions over the wheel wells of the vehicle.

It is a further advantage of the present invention that the quarter window glazing configuration permits the glazing to be automatically dropped and stored within housings formed in the quarter panels above the wheels, notwithstanding the vertical height of the installed glazing panels.

Other advantages, features, and objects of the present invention will become apparent to the reader of this specification.

DETAILED DESCRIPTION OF PREFERRED EMBODIMENTS

Figure 5:
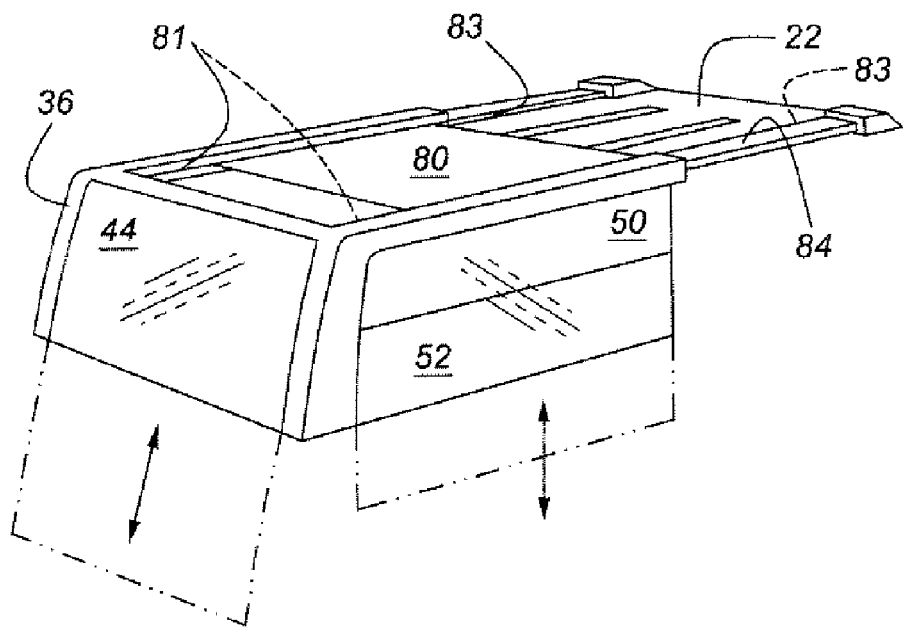
FIG. 5 is a schematic representation of a repositionable D-pillar roof structure according to the present invention.

As shown in FIGS. 1-4, an automotive vehicle having body 10, front roadwheels 15 and rear roadwheels 16, is equipped with front passenger doors 12 and rear passenger doors 14. Tailgate 28 is attached to the trailing part of body 10 adjacent to the most rearward portions of quarter panels 18 and 20. Repositionable D-pillar roof structure 36 allows body 10 to be reconfigured as shown in the various figures. D-pillar structure 36 is movable along the tops of quarter panels 18 and 20 by means of tracks 82 contained in quarter panels 18 and 20, as well as tracks 84, which are shown in FIG. 5 as mating with rails 86 which are an integral part of sliding repositionable D-pillar roof structure 36. As shown in the various figures, repositionable D-pillar roof structure 36 has slidable roof panel 80, commonly termed a "moon roof", which may be moved independently from D-pillar roof structure 36. Movement of slidable roof panel 80 is facilitated by tracks 81 carried by D-pillar structure 36 and tracks 83 mounted upon fixed roof panel 22. As an alternative, panel 80 may be retained upon structure 36 and displaced vertically either up or down to allow fore-and-aft movement of structure 36. Panel 80 may be formed from glass, or plastics, or metals, or composites known to those skilled in the art and suggested by this disclosure.

As an alternative to sliding roof panel 80, a fixed panel may be mounted permanently within D-pillar roof structure 36. In either event, D-pillar roof structure 36 may slide forward only if backlite 44 is in a position which allows structure 36 to move. In this case, backlite 44 must either be fully retracted within tailgate 28 or raised and retained by portable backlite drive module 70, and therefore movable with D-pillar structure 36.

Figure 7A:
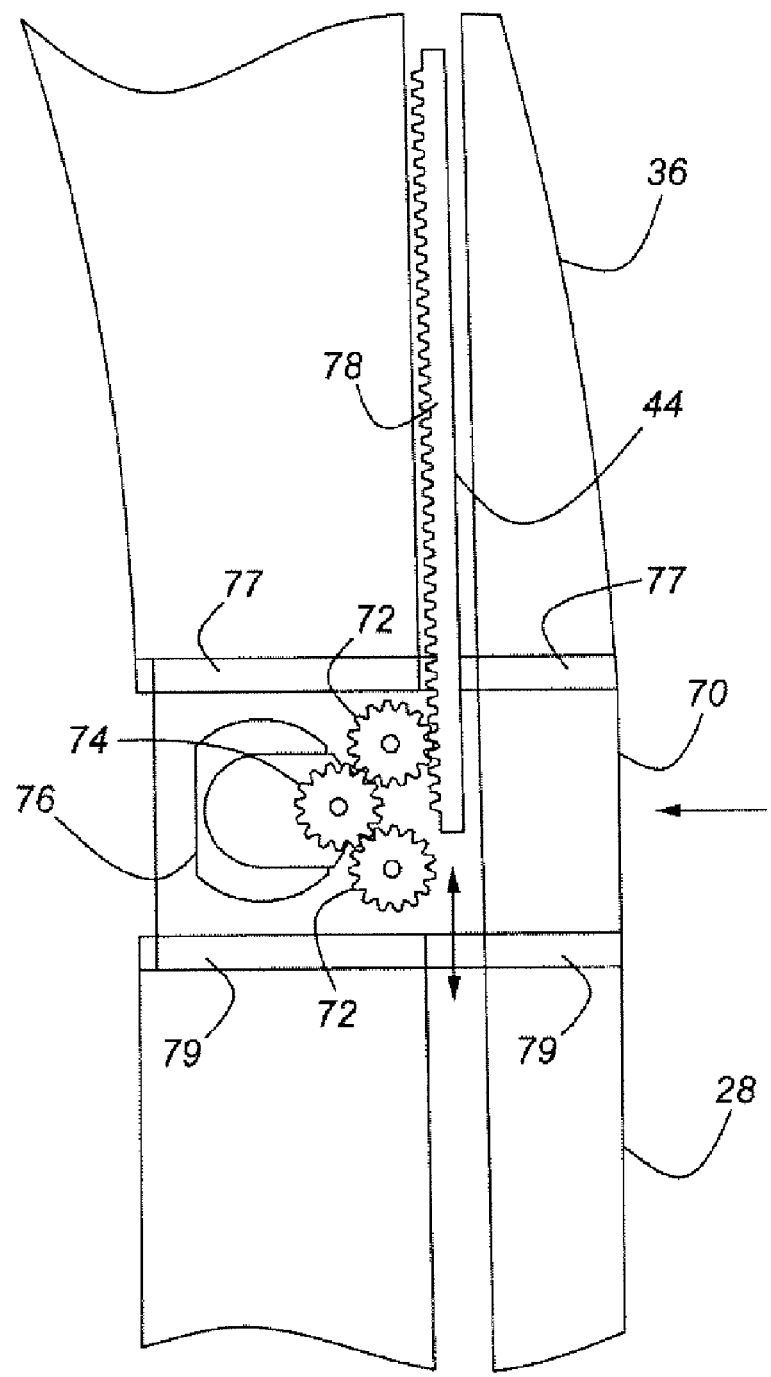
FIG. 7A is a partially schematic representation of a backlite drive system according to one aspect of the present invention.
Figure 7B:
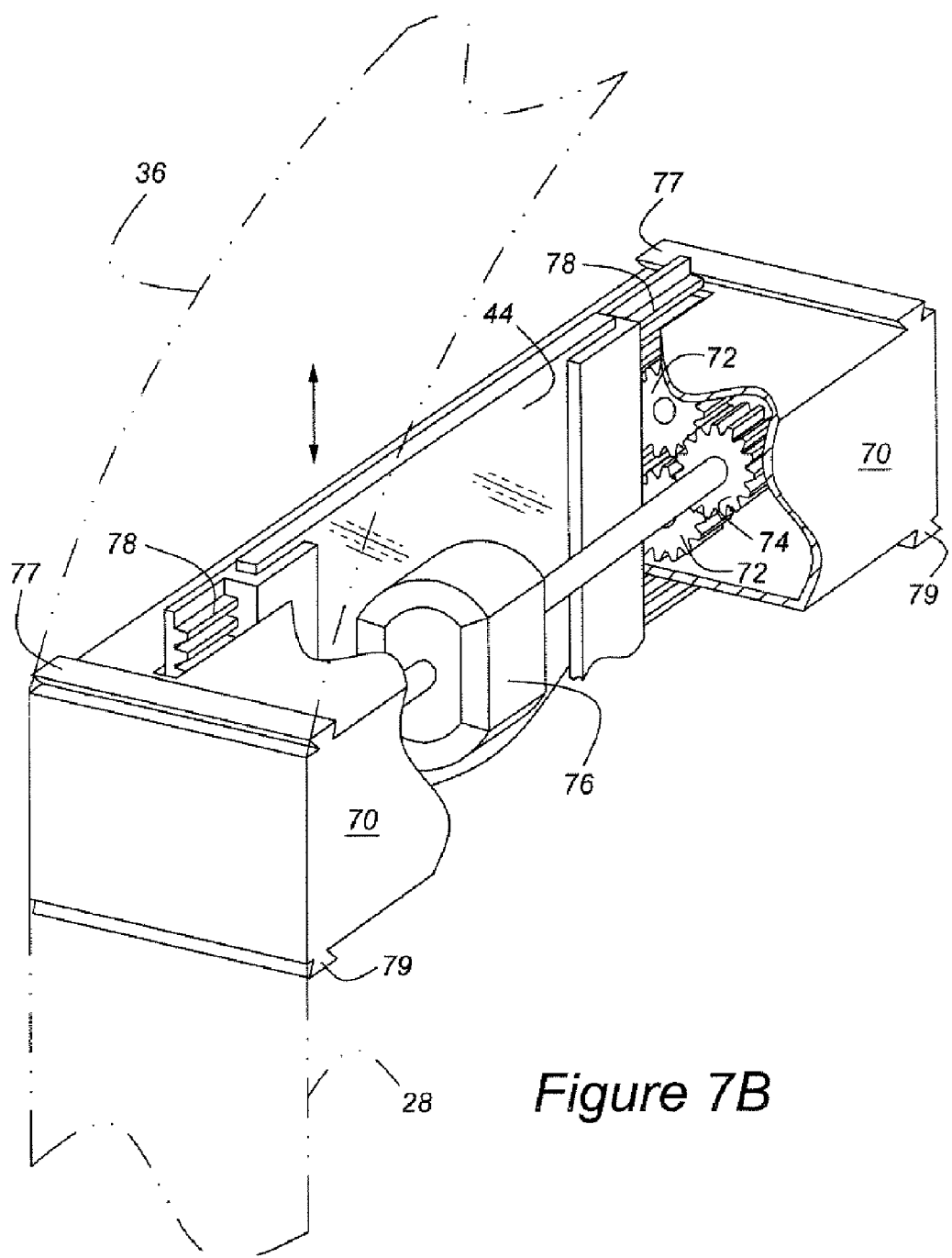
FIG. 7B is a perspective view of the backlite drive system illustrated in FIG. 7A.
Figure 8A:
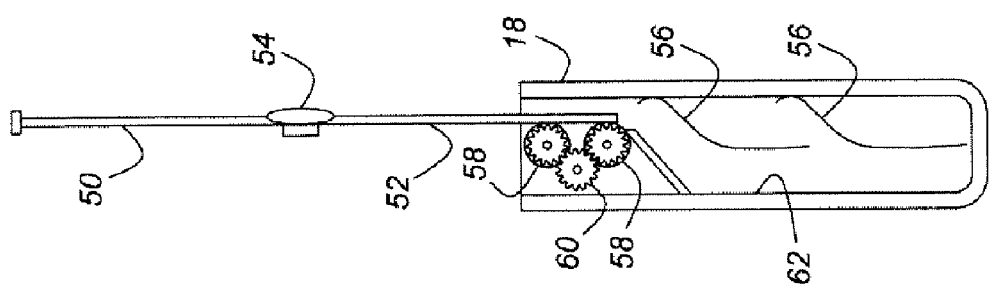
FIG. 8 illustrates a quarter window glazing panel handling mechanism according to one aspect of the present invention.
Figure 8B:
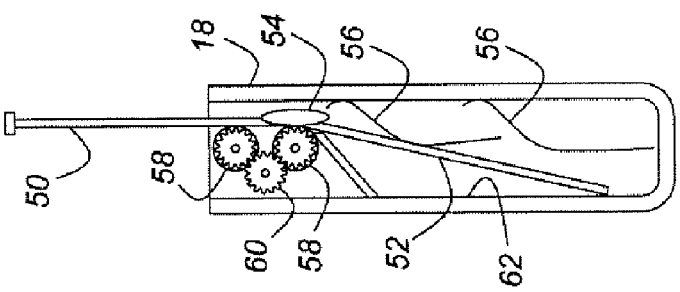
Figure 8C:
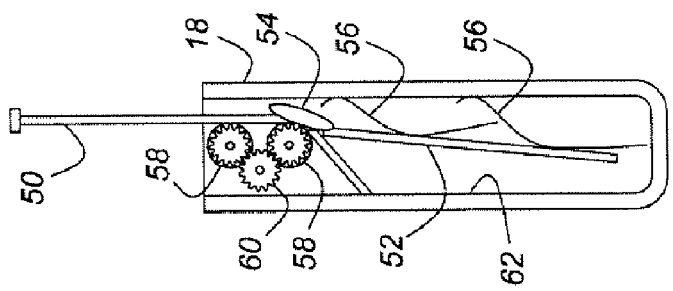
Figure 8E:
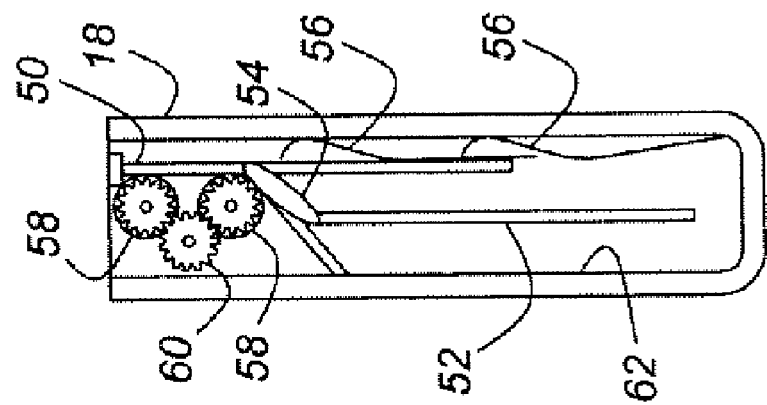
Figure 8D:
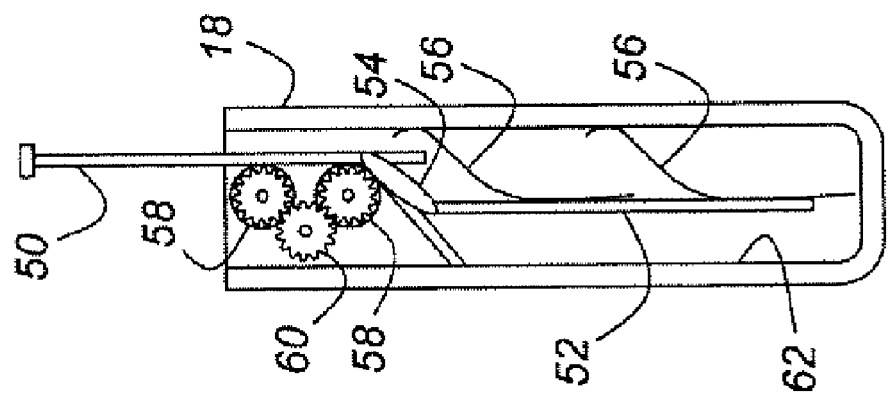
Figure 9:
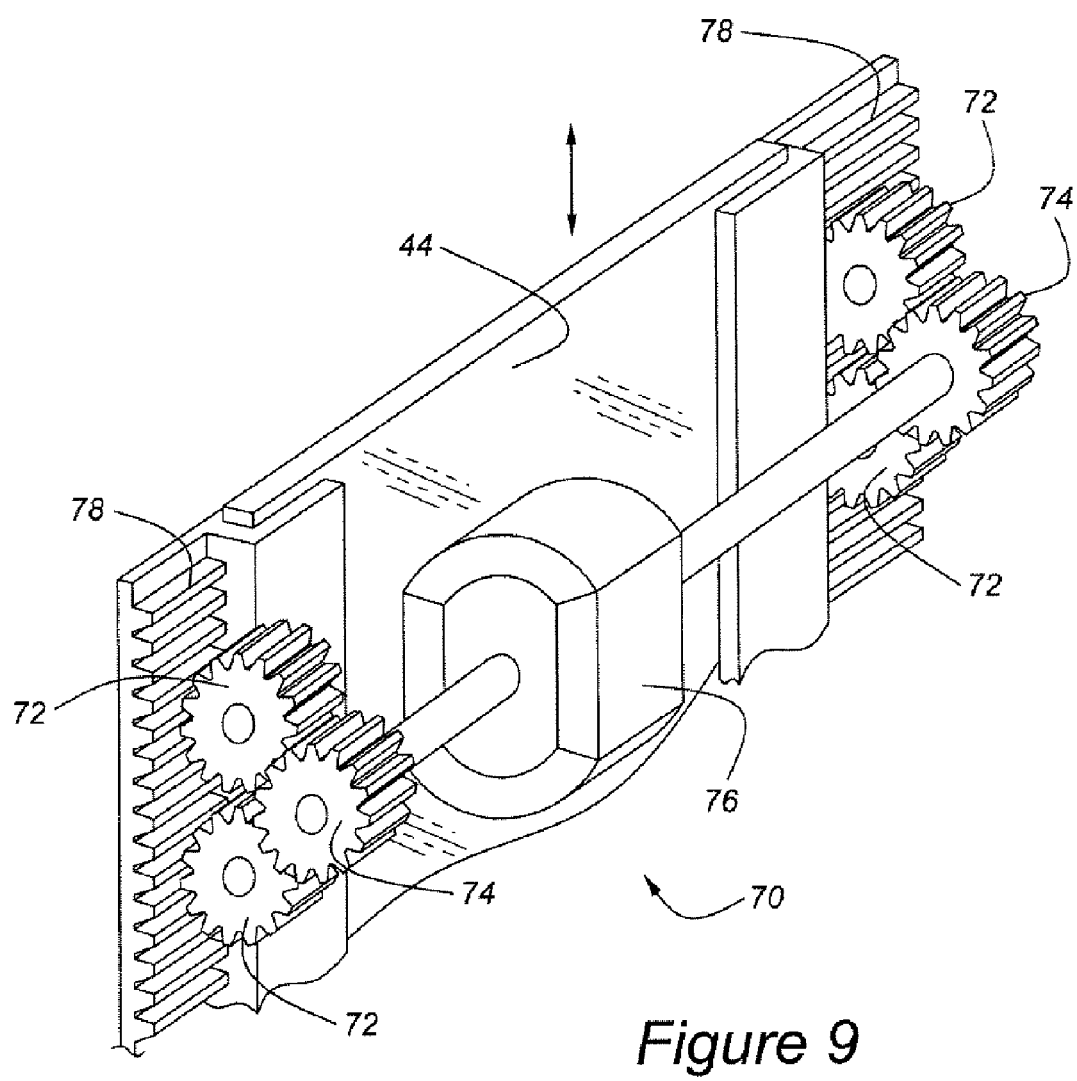
FIG. 9 illustrates a portion of the drive mechanism included in a portable backlite drive module according to one aspect of the present invention.

The position of motor driven backlite 44 is determined by portable backlite drive module 70, which is shown particularly in FIGS. 7A, 7B, and 9. Drive module 70 is said to be 'portable' because it is carried selectively upon either upon D-pillar structure 36, or upon tailgate 28. When module 70 is carried upon D-pillar structure 36 it moves translationally with D-pillar 36. Backlite 44 is raised and lowered by means of motor 76 acting through drive gears 74 and driven gears 72, which interact with racks 78 fixed to either side of backlite 44.

As mentioned above, when backlite 44 is in a raised and locked, or immobilized, position as shown in FIG. 7A, portable drive module 70 will move translationally with D-pillar structure 36 as the D-pillar structure is repositioned to either its most forward position behind second row of seats 38, or at any position intermediate the position at the rear of quarter panels 18 and 20 and the position immediately behind second row of seats 38. Module 70 is retained upon D-pillar structure 36 by dovetails 77 and by the longitudinal blocking capability of backlite 44. If on the other hand, backlite 44 is in its fully lowered position within tailgate 28, portable drive module 70 will be retained in part upon tailgate 28 by means of dovetails 79, as shown best in FIG. 7B.

The rack and pinion arrangement illustrated in FIG. 9 for operating backlite 44 has the advantage of requiring very little vertical packaging space. This means that module 70 need occupy only a small amount of the vertical space defined by the vehicle's rear vertical dimension.

Figure 6:
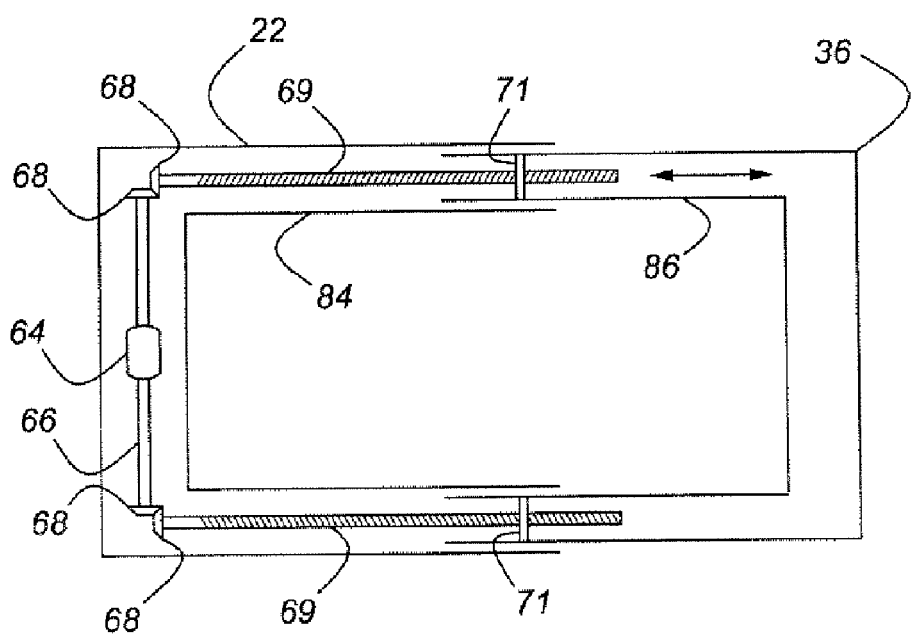
FIG. 6 is a schematic representation of a motor drive system for use with the repositionable D-pillar roof structure according to the present invention.

FIG. 6 is a schematic of sliding D-pillar 36, which moves upon tracks 84 carried upon fixed roof panel 22. In one embodiment, repositionable D-pillar roof structure 36 is positioned by means of drive motor 64, which operates drive shaft 66 and ultimately powers lead screws 69 through bevel gears 68. Finally, lead screws 69 interact with drive nuts 71 to move repositionable D-pillar 36 translationally.

As shown in the various figures, body 10 has quarter window glazing panels 50 and 52, which are dropped into the quarter panels 18 and 20 before D-pillar structure 36 moves forward from tailgate 28. As shown in FIG. 5, the quarter panel glazing system for each side of body 10 includes upper glazing panel 50 and lower glazing panel 52. Panels 50 and 52 are normally stacked vertically in the quarter window opening. As shown in FIG. 8, upper panel 50 is moved down to a position alongside lower panel 52 by means of drive rollers 58 which are actuated by means of drive gear 60. Drive gear 60 is actuated by means of a drive motor (not shown) which is similar to motor 76. Upper panel 50 is moved initially by means of drag link 54, which is interposed between upper panel 50 and lower panel 52. Upper panel 50 and lower panel 52 ultimately end up positioned alongside one another in panel housing 62 which is formed, in the example shown, within quarter panel 18. While panels 50 and 52 are located within storage housing 62, leaf spring guides 56 prevent panels 50 and 52 from rattling objectionably. Because each of panels 50 and 52 need only encompass one-half of the vertical height of the quarter window opening, it is possible to house both glazing panels above roadwheel 16. This represents a significant advantage as compared with prior art movable roof systems. Those skilled in the art will appreciate in view of this disclosure that although panels 50 and 52 are termed "glazing panels", they may be formed not only from glass, but also from alternative metallic or non-metallic materials, including transparent, translucent, and opaque materials commonly employed for automotive exterior panels.

Figure 1:
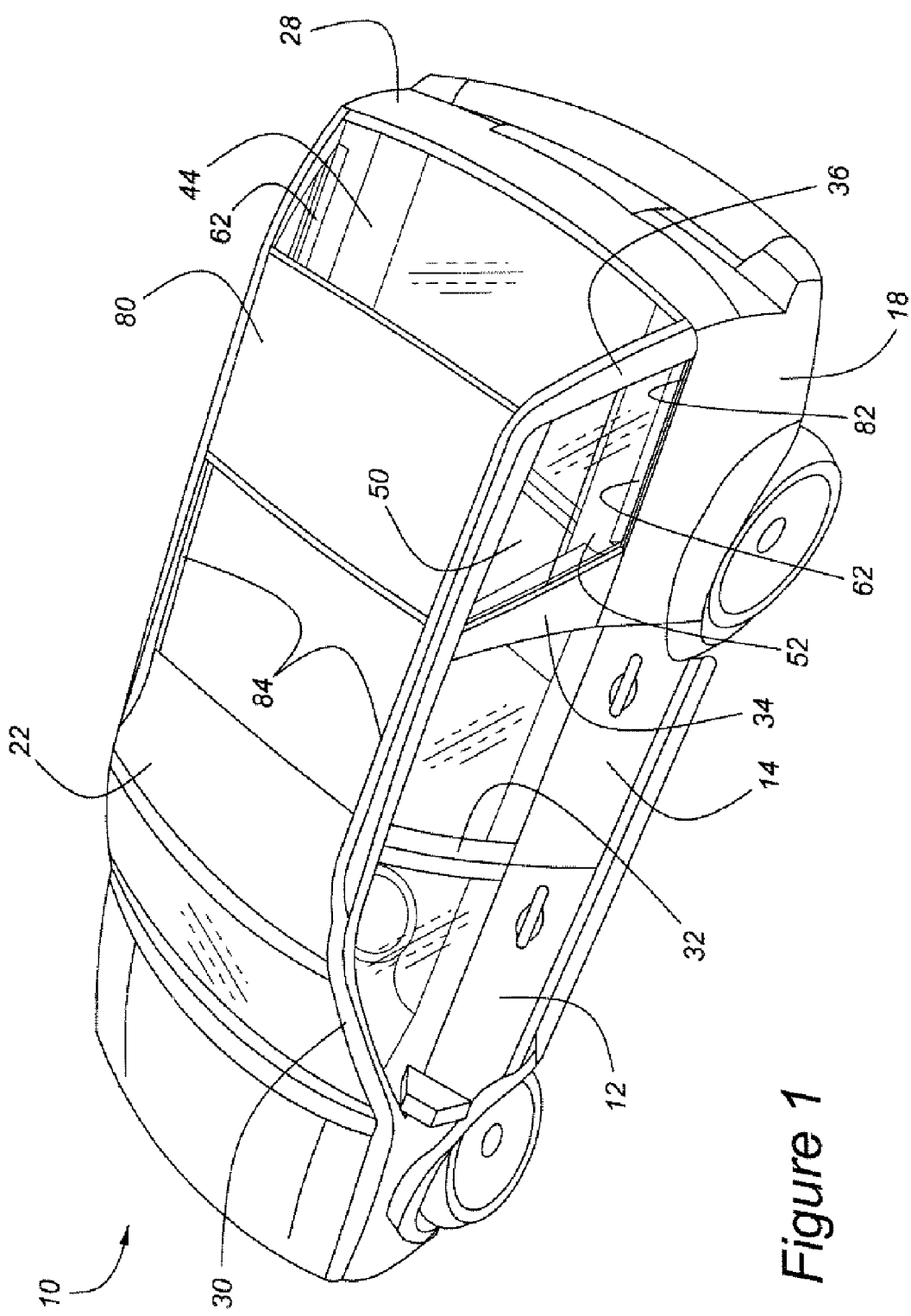
FIG. 1 is a perspective view of a vehicle having a repositionable D-pillar roof structure according to the present invention.
Figure 2:
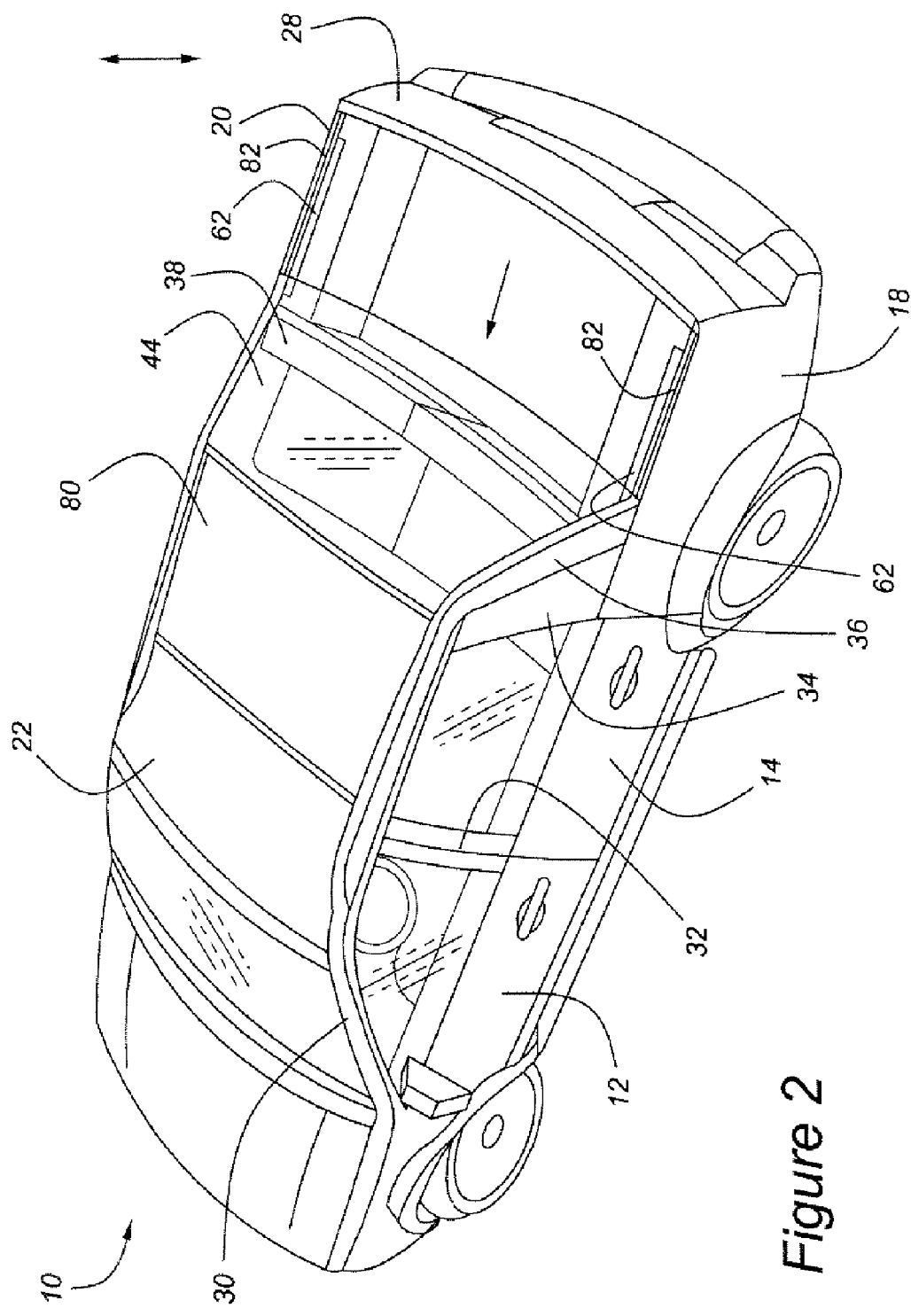
FIG. 2 illustrates the vehicle of FIG. 1 with the repositionable D-pillar in a fully forward position.
Figure 3:
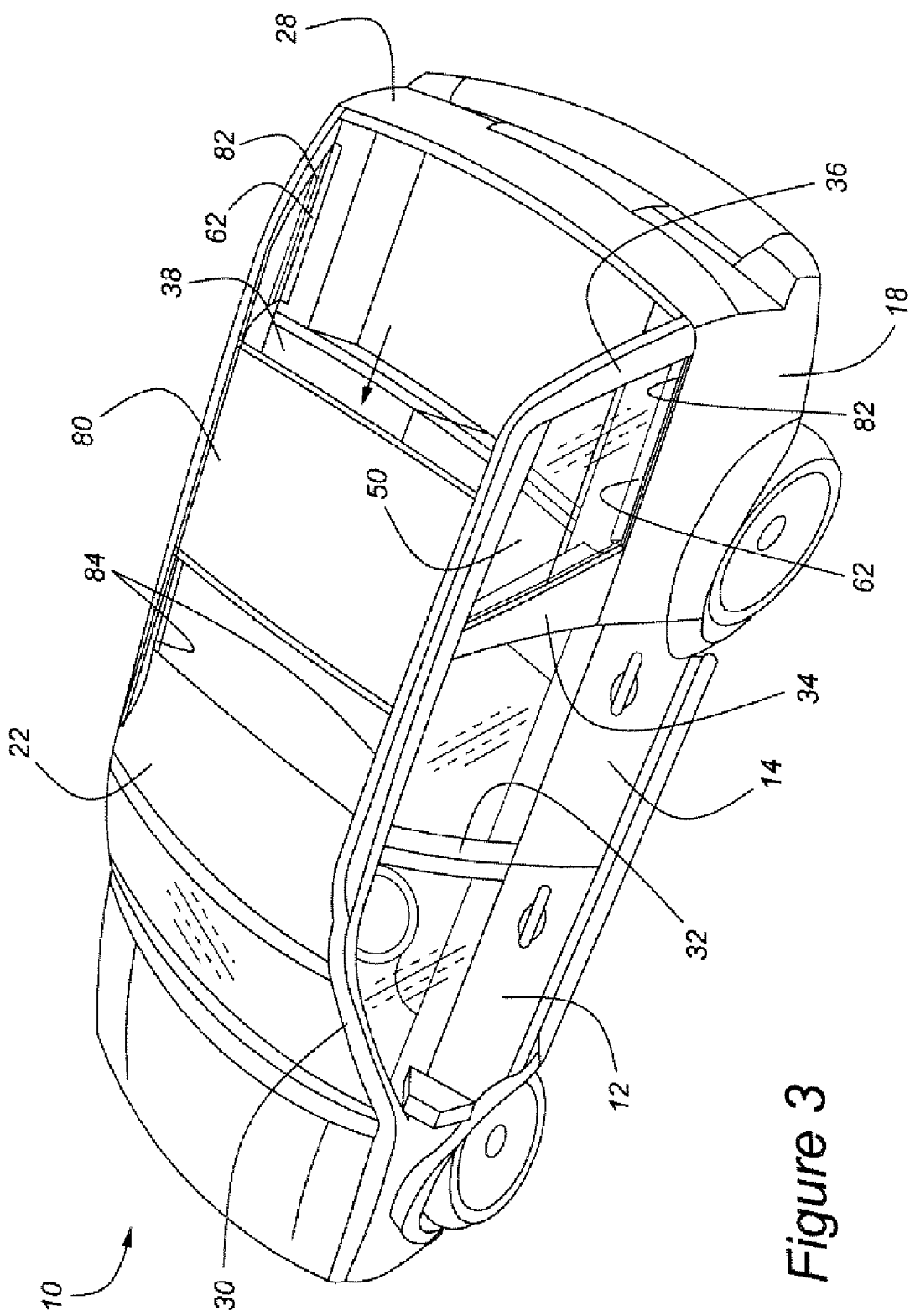
FIG. 3 illustrates vehicle of FIG. 1 with a sliding roof panel partially open and with a backlite fully retracted into the tailgate.
Figure 4:
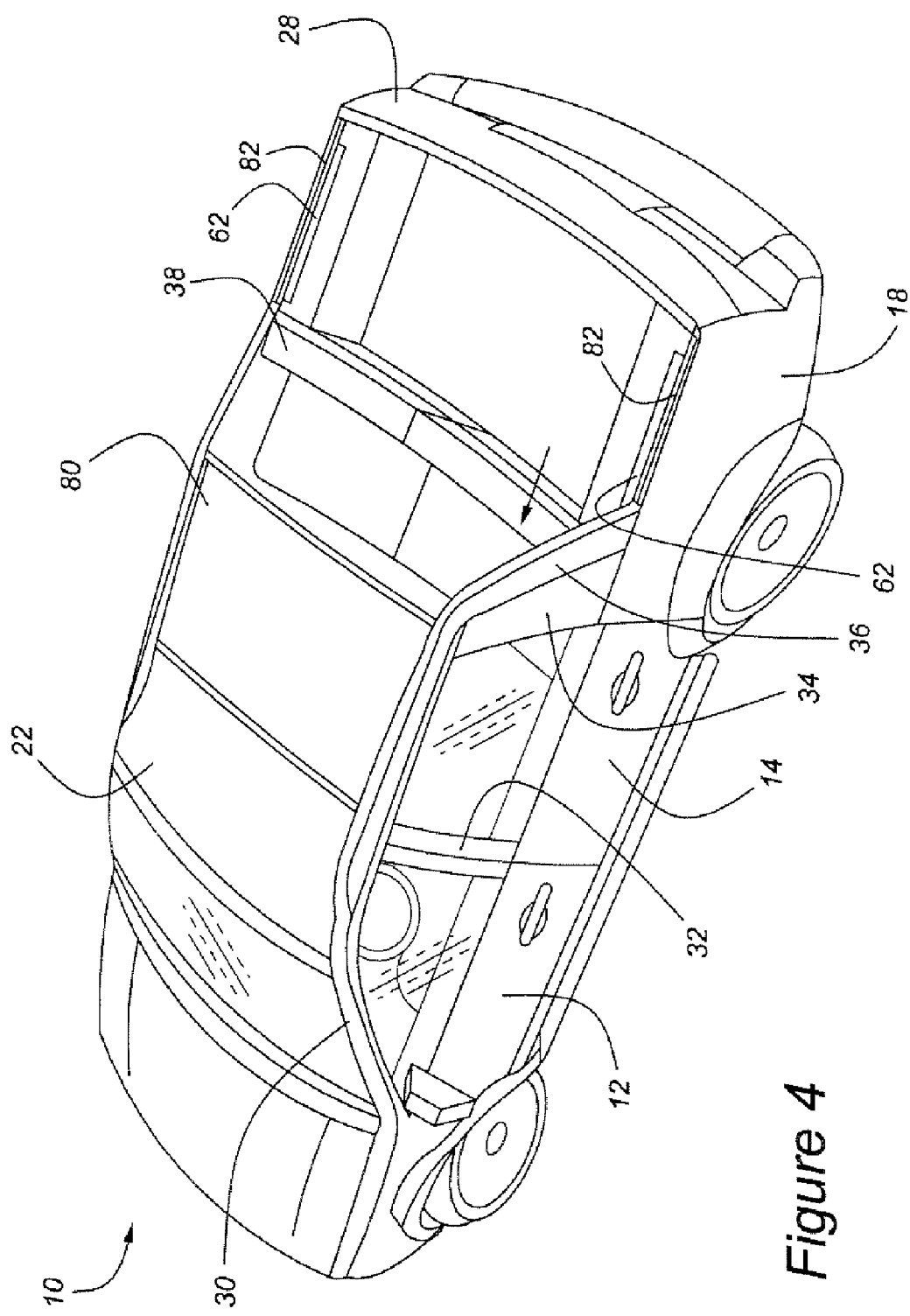
FIG. 4 illustrates the configuration of FIG. 2, with the backlite having been retracted into the tailgate prior to movement of the repositionable D-pillar to its forwardmost position.

According to another aspect of the present invention, a method for operating a sliding D-pillar roof structure in an automotive vehicle includes the steps of raising backlite 44 from tailgate 28, by means of portable backlite drive module 70, into a retained position within D-pillar roof structure 36. Then, quarter window panels 50 and 52 will be lowered into quarter glazing panel housings 62 in each quarter panel and then D-pillar roof structure 36 will be moved upon tracks 84 attached to fixed roof panel 22 and tracks 82, attached to quarter panels 18 and 20, into a position behind second row of seats 38 such that backlite 44 will be sealingly engaged with second row of seats 38. In essence, second row of seats 38 functions as a bulkhead. As an alternative, a dedicated bulkhead not having any seating capability (not shown) may be installed. D-pillar roof structure 36 may be moved to the position shown in FIG. 4, wherein backlite 44 is housed within tailgate 28 and structure 36 is forward. Second row of seats 38 may be folded down independently, (i.e., the left and right seats may be folded without folding the other seat), to permit the carriage of large objects, which is further facilitated by the forward movement of sliding roof panel 80, which is shown in a partly open position in FIG. 3. Panel 80 may be opened fully, or partially, as shown in FIG. 3, regardless of whether backlite 44 is housed within tailgate 28 or carried upon repositionable D-pillar structure 36.

Figure 10:
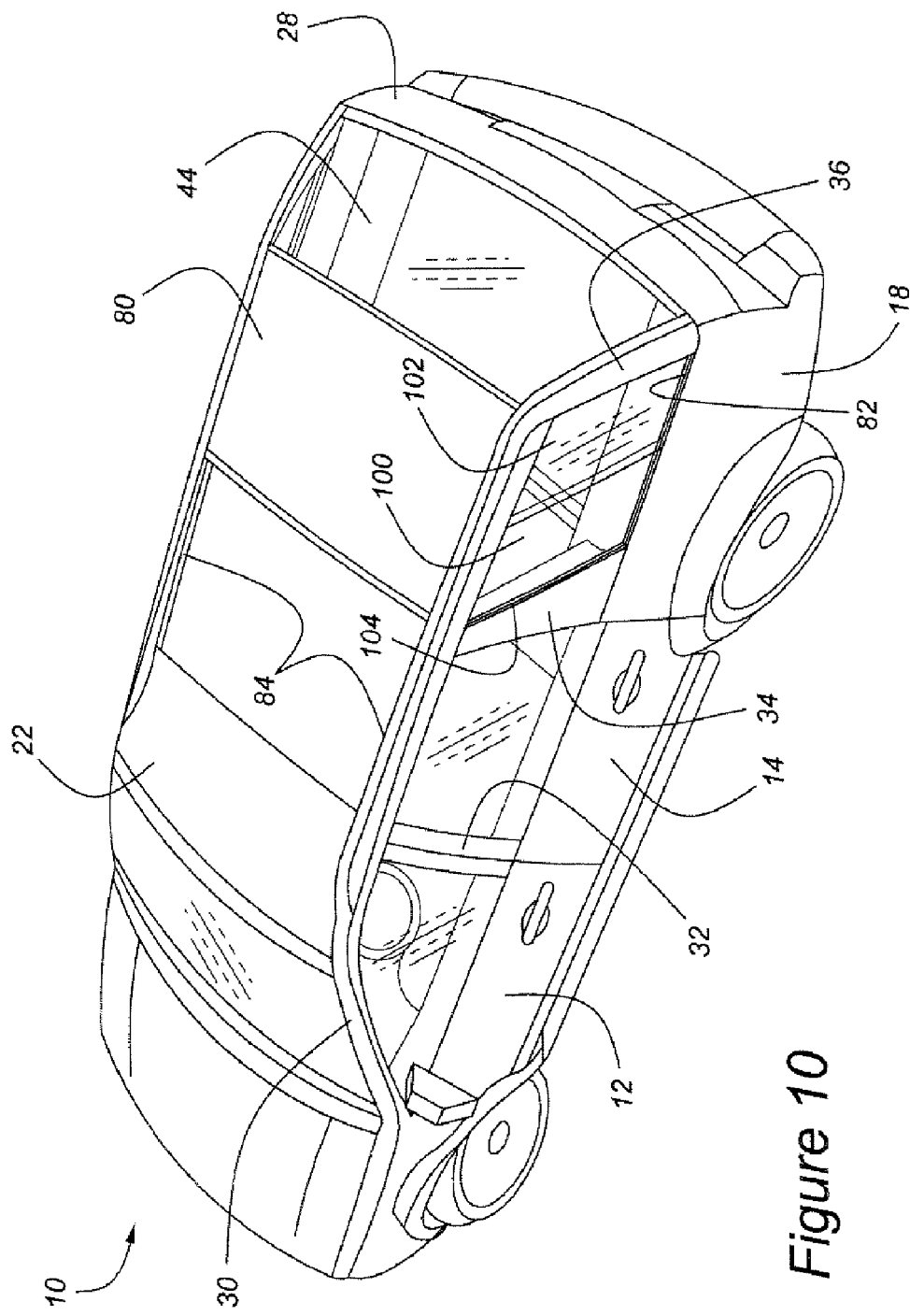
FIG. 10 illustrates an additional embodiment of the present invention in which the quarter windows, 100, 102, slide horizontally as D pillar 36 moves fore and aft.

FIG. 10 illustrates an additional embodiment of the present invention in which the quarter windows, 100, 102, slide telescopically and horizontally as D-pillar roof structure 36 moves fore and aft. When D-pillar 36 is in its farthest-forward position, windows 100 and 102 will be partially housed within recess 104 formed in C-pillar 34.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. An automotive vehicle body, comprising:
a plurality of passenger access doors;
opposing quarter panels extending rearwardly from the location of at least two of said access doors;
a tailgate attached to a trailing portion of said body adjacent the most rearward portions of said quarter panels;
a repositionable D-pillar structure slidingly engaged with said quarter panels and movable along said quarter panels from a first position adjacent said tailgate to a second position forward of said tailgate; and
a sliding backlite having at least a first position in which said backlite is retracted within said tailgate and a second position in which the backlite is carried upon and movable with said D-pillar structure.

2. An automotive body according to claim 1, further comprising a plurality of quarter window panels, with each of said panels having a first position within a window opening in said D-pillar structure and a second position within a housing contained in a mating one of said quarter panels at a location above a roadwheel.

3. An automotive body according to claim 2, wherein said quarter window panels comprise a plurality of generally horizontal glazing panels having a first position in which said panels are stacked vertically in one of said window openings and a second position in which said panels are stored side-by-side within a housing contained within one of said quarter panels.

4. An automotive body according to claim 1, wherein said backlite is sealingly engaged with a bulkhead within said body when said D-pillar structure is in said second position.

5. An automotive body according to claim 4, wherein said bulkhead comprises a second row of seats within said body.

6. An automotive body according to claim 5, wherein each of said seats is independently operable.

7. An automotive body according to claim 1, further comprising a slidable roof panel mounted within said D-pillar structure and slidable upon a first set of tracks formed in said D-pillar structure and a second set of tracks formed in a fixed roof panel.

8. An automotive body according to claim 1, further comprising a slidable roof panel mounted within said D-pillar structure and slidable upon a single set of tracks formed in a fixed roof panel.

9. An automotive body according to claim 1, wherein said D-pillar structure is mounted upon a first set of tracks carried by said quarter panels and a second set of tracks carried by a fixed roof panel.

10. An automotive body according to claim 1, further comprising a portable window drive mechanism for positioning said sliding backlite, with said portable drive mechanism being selectively carried upon either said tailgate or said D-pillar structure.

11. An automotive body according to claim 1, further comprising a plurality of quarter window panels which slide telescopically and horizontally as said D-pillar moves slidingly along said quarter panels.

12. An automotive vehicle body, comprising:
a plurality of passenger access doors;
opposing quarter panels extending rearwardly from the locations of at least two of said access doors;
a tailgate attached to said body adjacent the trailing portions of said quarter panels;
a motor-driven, repositionable D-pillar roof structure slidingly engaged with said quarter panels and with a fixed roof panel, with said D-pillar roof structure being movable from a first position adjacent said tailgate to a second position forward of said tailgate;
a motor-driven backlite having at least an open position in which said backlite is retracted within said tailgate, a closed position in which the backlite extends between said tailgate and said D-pillar structure, and a traveling position in which the backlite is released from said tailgate and carried upon and translationally movable with said D-pillar structure; and
a plurality of motor-driven retractable quarter window panels, with each of said panels having a first position within a window opening in said D-pillar structure and a second position within a mating one of said quarter panels at a location above a roadwheel.

13. An automotive body according to claim 12, further comprising a slidable roof panel mounted within said D-pillar structure and slidable upon a first set of tracks formed in said D-pillar structure and a second set of tracks formed in a fixed roof panel.

14. An automotive body according to claim 12, wherein said slidable roof panel is operable in a first mode in which said slidable roof panel moves independently from said D-pillar structure, as well as in a second mode, in which slidable roof panel moves with said D-pillar structure.

15. An automotive body according to claim 12, further comprising a slidable roof panel mounted within said pillar structure and slidable upon a set of tracks carried externally of said body upon a fixed roof panel.

16. An automotive body according to claim 12, wherein said quarter window panels comprise glazing panels.

17. A method for operating a sliding D-pillar roof structure in an automotive vehicle, comprising the steps of:
raising a backlite from a tailgate and into an immobilized position within a sliding D-pillar roof structure;
lowering a plurality of generally horizontal quarter window panels from positions within said D-pillar roof structure and into stored positions within housings contained within opposing quarter panels above roadwheels associated with said quarter panels; and
sliding said D-pillar roof structure, incorporating said backlite, forwardly upon a first set of tracks carried by said quarter panels and a second set of tracks carried by a fixed roof panel.

18. A method according to claim 17, wherein said backlite is raised from said tailgate and into an immobilized position within said sliding D-pillar roof structure by means of a portable backlite drive module carried selectively upon said sliding D-pillar structure.

19. A method according to claim 17, wherein said quarter window panels comprise glazing panels.

* * * * *